US012794166B2

(12) United States Patent
Batley, III et al.

(10) Patent No.: US 12,794,166 B2
(45) Date of Patent: Nov. 10, 2026

(54) ELECTRICAL CONNECTOR SYSTEM

(71) Applicant: TE Connectivity Solutions GmbH, Schaffhausen (CH)

(72) Inventors: Richard C. Batley, III, Middletown, PA (US); Vinayakumar Shettar, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 374 days.

(21) Appl. No.: 18/413,125

(22) Filed: Jan. 16, 2024

(65) Prior Publication Data

US 2025/0233341 A1 Jul. 17, 2025

(51) Int. Cl.
*H01R 13/436* (2006.01)
*H01R 13/74* (2006.01)

(52) U.S. Cl.
CPC ....... *H01R 13/4367* (2013.01); *H01R 13/743* (2013.01)

(58) Field of Classification Search
CPC .................................................. H01R 13/4367
USPC .......................................................... 439/660
See application file for complete search history.

(56) References Cited

U.S. PATENT DOCUMENTS

| | | | | |
|---|---|---|---|---|
| 7,942,707 B2 * | 5/2011 | Orris | H01R 13/432 | 439/748 |
| 10,381,766 B2 * | 8/2019 | Bhagyanathan Sathianathan | H01R 13/432 | |
| 2004/0110427 A1 * | 6/2004 | Shi | H01R 13/4367 | 439/752 |
| 2004/0253881 A1 * | 12/2004 | Sakurai | H01R 4/185 | 439/752 |
| 2005/0014422 A1 * | 1/2005 | Patel | H01R 13/114 | 439/851 |
| 2009/0036002 A1 * | 2/2009 | Arai | H01R 13/432 | 439/825 |
| 2023/0318218 A1 * | 10/2023 | Enomoto | H01R 13/428 | 439/660 |

* cited by examiner

*Primary Examiner* — Tulsidas C Patel
*Assistant Examiner* — Jeffrey Mountain

(57) ABSTRACT

An electrical connector system includes a connector housing which includes a base and a plurality of terminal cavities extending through the base. The base includes a retention shoulder within each terminal cavity. The base includes orientation slots associated with the corresponding terminal cavities. The base includes guide funnels funneling into the corresponding terminal cavities. Each guide funnel includes a ramp angled toward the orientation slot. The electrical connector system includes terminals received in the corresponding terminal cavities. Each terminal includes an orientation tab. The orientation tab configured to be received in the funnel and guided by the ramp to the orientation slot. The orientation tab is received in the orientation slot to orient the terminal relative to the connector housing. Each terminal includes a locking lance engaging the corresponding retention shoulder to retain the terminal in the corresponding terminal cavity.

20 Claims, 8 Drawing Sheets

ELECTRICAL CONNECTOR SYSTEM

BACKGROUND OF THE INVENTION

The subject matter herein relates generally to electrical connectors.

Electrical connectors are used within electrical connector systems to provide an electrical connection between various components of the system. For example, the electrical connectors may transmit data and/or power across the connector interface. Electrical connectors terminated to ends of cables are known as cable connectors and the cables transmit the data and/or power to/from the electrical connector to a remote location within the system. The cables are terminated to terminals, which are held in a housing for mating with the mating electrical connector. Assembly of the electrical connector may be problematic. For example, properly orienting and locating the terminals in the housing for mating with the mating connector may be difficult. Improperly loaded terminals are subject to damage or improper mating when mating with the mating connector.

There is a need for an electrical connector having locating features for positioning terminals in the housing thereof.

BRIEF DESCRIPTION OF THE INVENTION

In one embodiment, an electrical connector system is provided and includes a connector housing which includes a base and a plurality of terminal cavities extending through the base. The base includes a retention shoulder within each terminal cavity. The base includes orientation slots associated with the corresponding terminal cavities. The base includes guide funnels funneling into the corresponding terminal cavities. Each guide funnel includes a ramp angled toward the orientation slot. The electrical connector system includes terminals received in the corresponding terminal cavities. Each terminal includes an orientation tab. The orientation tab configured to be received in the funnel and guided by the ramp to the orientation slot. The orientation tab is received in the orientation slot to orient the terminal relative to the connector housing. Each terminal includes a locking lance engaging the corresponding retention shoulder to retain the terminal in the corresponding terminal cavity.

In another embodiment, an electrical connector system is provided and includes a connector housing which includes a base and a plurality of terminal cavities extending through the base. The base includes a retention shoulder within each terminal cavity. The base includes orientation slots. The orientation slots include a first orientation slot and a second orientation slot associated with each terminal cavity. The base includes guide funnels funneling into the corresponding terminal cavities. Each guide funnel includes a ridge located between the first orientation slot and the second orientation slot of the corresponding terminal cavity. Each guide funnel includes a first ramp angled between the ridge and the first orientation slot and a second ramp angled between the ridge and the second orientation slot. The electrical connector system includes terminals received in the corresponding terminal cavities. Each terminal includes an orientation tab. The orientation tab configured to be received in the funnel to interface with either the first ramp or the second ramp to funnel the orientation tab to the first orientation slot or the second orientation slot, respectively. To orient the terminal relative to the connector housing in either a first orientation or a second orientation, respectively. Each terminal includes a locking lance engaging the corresponding retention shoulder to retain the terminal in the corresponding terminal cavity.

In a further embodiment, an electrical connector system is provided and includes a connector housing which includes a base and a plurality of terminal cavities extending through the base. The base includes a retention shoulder within each terminal cavity. The base includes orientation slots associated with the corresponding terminal cavities. The electrical connector system includes terminals received in the corresponding terminal cavities. Each terminal includes an orientation tab. The orientation tab configured to be received in the orientation slot to orient the terminal relative to the connector housing. Each terminal includes a locking lance engaging the corresponding retention shoulder to retain the terminal in the corresponding terminal cavity.

DETAILED DESCRIPTION OF THE INVENTION

Figure 1:
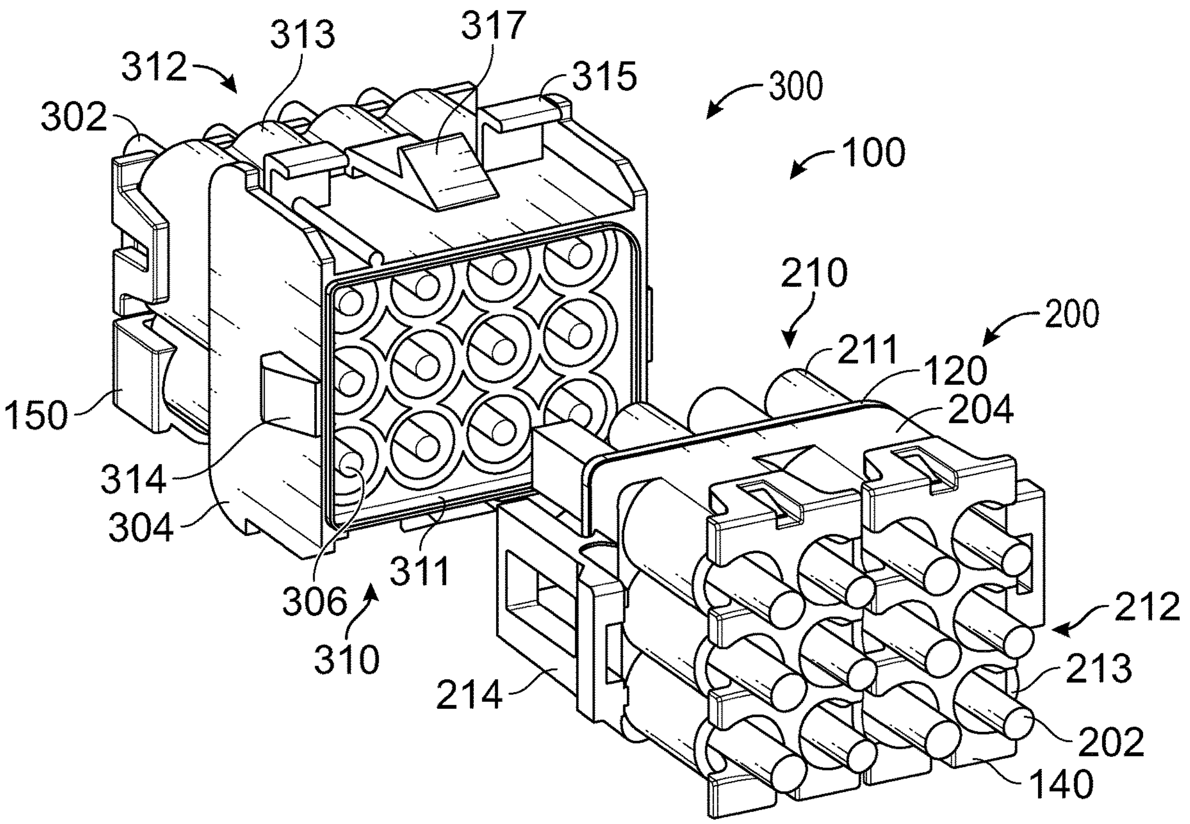
FIG. 1 illustrates an electrical connector system in accordance with an exemplary embodiment showing a first electrical connector and a second electrical connector poised for mating with each other.
Figure 2:
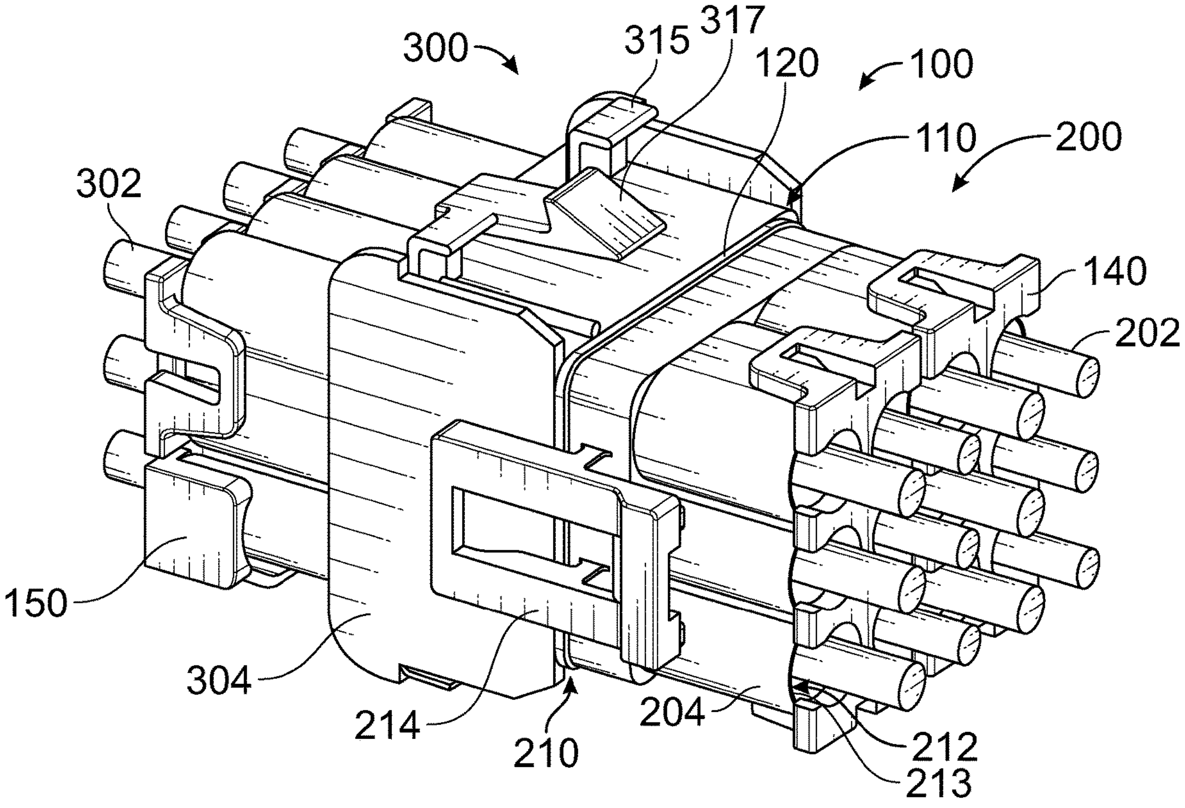
FIG. 2 illustrates the electrical connector system in accordance with an exemplary embodiment showing the first electrical connector and the second electrical connector mated together.

FIG. 1 illustrates an electrical connector system 100 in accordance with an exemplary embodiment showing a first electrical connector 200 and a second electrical connector 300 poised for mating with each other. FIG. 2 illustrates the electrical connector system 100 in accordance with an exemplary embodiment showing the first electrical connector 200 and the second electrical connector 300 mated together.

The electrical connectors 200, 300 are configured to be mated at a separable mating interface 110. The electrical connector 300 is considered a mating electrical connector for the electrical connector 200 and components thereof may be identified hereinafter as "mating" components. The electrical connector 200 is considered a mating electrical connector for the electrical connector 300 and components thereof may be identified hereinafter as "mating" components.

In the illustrated embodiment, the electrical connectors 200, 300 are cable electrical connectors provided at ends of cables 202, 302, respectively. In an exemplary embodiment, the electrical connectors 200, 300 are power connectors configured to transmit power across the separable mating interface; however, the electrical connectors 200, 300 may additionally or alternatively transmit data across the separable mating interface. In various embodiments, the electrical connectors 200, 300 may be used in automotive applications, industrial applications, appliances, or other applications.

Figure 3:
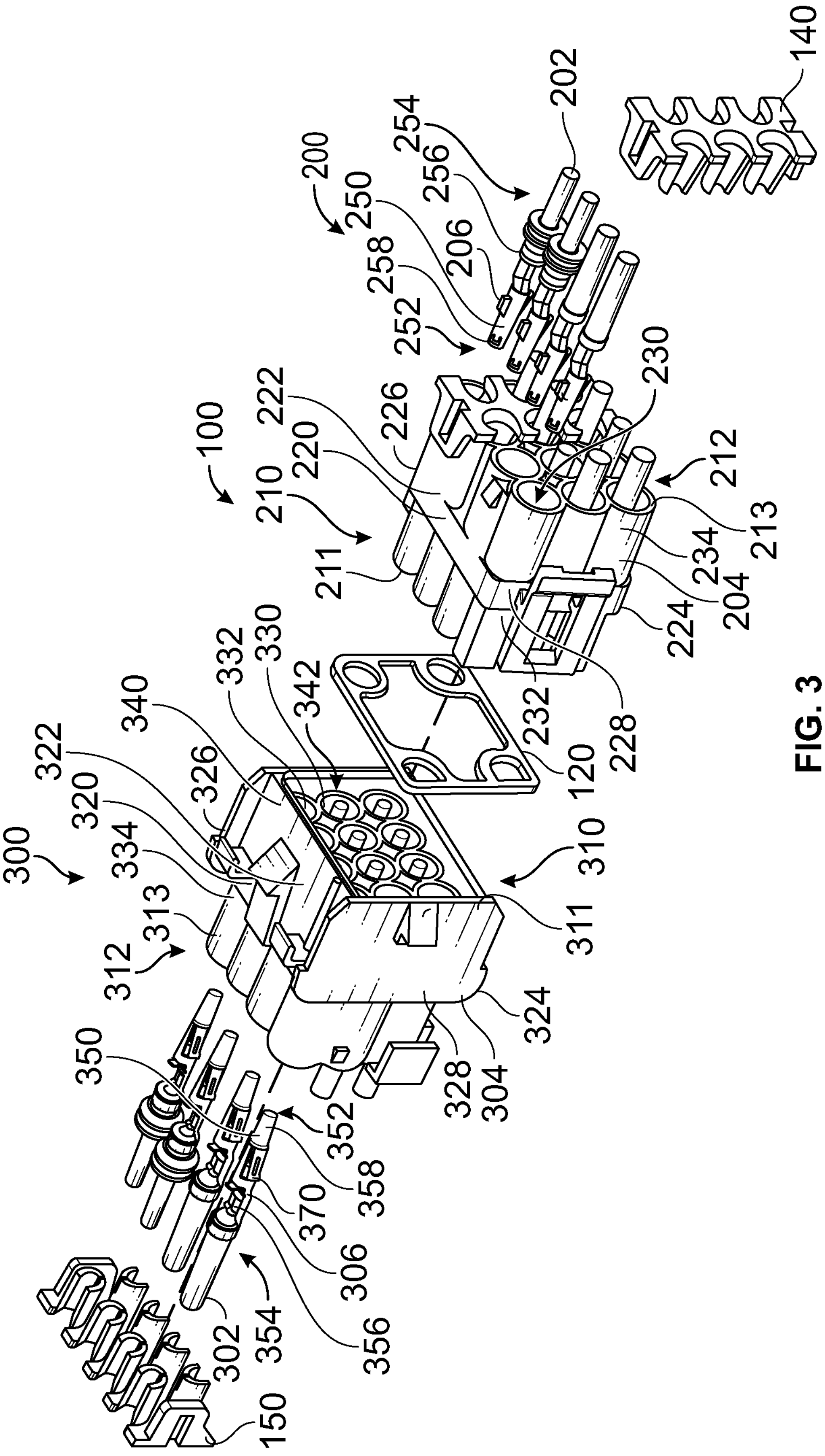
FIG. 3 is an exploded view of the electrical connector system in accordance with an exemplary embodiment.

The electrical connector 200 includes a connector housing 204 holding terminals 206 (shown in FIG. 3). The terminals 206 are terminated to corresponding cables 202. The connector housing 204 extends between a mating end 210 at a front 211 of the connector housing 204 and a cable end 212 at a rear 213 of the connector housing 204. The cables 202 extend from the cable end 212. The mating end 210 is configured to be mated to the electrical connector 300.

In an exemplary embodiment, the electrical connector 200 includes one or more terminal position assurance (TPA) devices 140 coupled to the connector housing 204. The TPA devices 140 are used to ensure that the terminals 206 are properly loaded and retained in the connector housing 204. In the illustrated embodiment, the TPA devices 140 are coupled to the rear 213 of the connector housing 204. The cables 202 extend through the TPA devices 140. Proper installation of the TPA devices 140 provides assurance to the installer that the terminals 206 are properly installed within the connector housing 204.

In the illustrated embodiment, the mating end 210 of the connector housing 204 is configured to be plugged into the electrical connector 300. The electrical connector 200 thus defines a plug connector and the mating electrical connector 300 defines a receptacle connector that receives the mating end 210 of the plug connector 200.

The electrical connector 300 includes a connector housing 304 holding terminals 306. The terminals 306 are terminated to corresponding cables 302. The connector housing 304 extends between a mating end 310 at a front 311 of the connector housing 304 and a cable end 312 at a rear 313 of the connector housing 304. The cables 302 extend from the cable end 312. The mating end 310 is configured to be mated to the electrical connector 200.

In the illustrated embodiment, the mating end 310 of the connector housing 304 defines a receptacle that receives the mating end 210 of the electrical connector 200. The electrical connector 300 thus defines a receptacle connector and the mating electrical connector 200 defines a plug connector.

In an exemplary embodiment, the electrical connector 300 includes one or more terminal position assurance (TPA) devices 150 coupled to the connector housing 304. The TPA devices 150 are used to ensure that the terminals 306 are properly loaded and retained in the connector housing 304. In the illustrated embodiment, the TPA devices 150 are coupled to the rear 313 of the connector housing 304. The cables 302 extend through the TPA devices 150. Proper installation of the TPA devices 150 provides assurance to the installer that the terminals 306 are properly installed within the connector housing 304.

In an exemplary embodiment, the electrical connector 300 is configured to be mounted to another component, such as a panel. For example, the electrical connector 300 may be received in a panel opening in the panel such that the mating end 310 of the connector housing 304 is located forward of the panel and the cable end 312 of the connector housing 304 is located rearward of the panel. The electrical connector 300 includes mounting tabs 315 and a latch 317 used to secure the electrical connector 300 to the panel. For example, the mounting tabs 315 may engage a rear side of the panel in the latch 317 may be latchably coupled to a front side of the panel. The latch 317 is deflectable to allow removal of the electrical connector 300 from the panel. Optionally, mounting tabs 315 and latches 317 may be provided at both the top and the bottom of the connector housing 304. Other types of mounting features may be used in alternative embodiments to secure the electrical connector 300 to the panel. For example, fasteners may be used to secure the electrical connector 300 to the panel.

In an exemplary embodiment, the connector housing 304 includes latching features 314 used to secure the electrical connector 300 to the electrical connector 200. For example, the latching features 314 may be latching tabs extending from the sides of the connector housing 304. Each latching tab may include a latching surface. The connector housing 204 includes latches 214 that interface with the latching features 314 to secure the electrical connector 200 to the electrical connector 300. The latches 214 are provided at opposite sides of the connector housing 204. The latches 214 are deflectable latches configured to be released from the latching features 314 to allow removal of the electrical connector 200 from the electrical connector 300.

In an exemplary embodiment, a facial seal 120 is provided at the mating interface 110 between the electrical connectors 200, 300. The facial seal 120 is configured to be sealingly coupled to the front 211 of the connector housing 204 and is configured to be sealingly coupled to the front 311 of the connector housing 304. The facial seal 120 provides a sealed interface between the electrical connectors 200, 300. In an exemplary embodiment, the facial seal 120 extend circumferentially around the perimeter of the connector housing 204 and/or the connector housing 304. The facial seal 120 may be compressed between the connector housings 204, 304 when the electrical connectors 200, 300 are mated. The facial seal 120 may be a sealing gasket. In various embodiments, the facial seal 120 is manufactured from a rubber material. In various embodiments, the cables 202 and/or the cables 302 may be sealed within the connector housings 204, 304, respectively. For example, cable seals (not shown) may be provided between the cables 202 and the connector housing 204 and/or between the cables 302 and the connector housing 304.

In the illustrated embodiment, the electrical connectors are twelve position electrical connectors 200, 300. The terminals and cables are arranged in a 4×3 matrix (4 columns×3 rows). However, greater or fewer rows and columns of terminals and cables may be used in alternative embodiments, such as in a 3×3 matrix (3 columns×3 rows), in a 2×3 matrix (2 columns×3 rows), in a 4×1 matrix (4 columns×1 rows), in a 3×1 matrix (3 columns×1 rows), in a 2×1 matrix (2 columns×1 rows), and the like. Other types of electrical connectors having a different number of terminal positions may be provided in other embodiments.

FIG. 3 is an exploded view of the electrical connector system 100 in accordance with an exemplary embodiment. The electrical connector system 100 includes the first and second electrical connectors 200, 300 and a facial seal 120 between the first and second electrical connectors 200, 300. FIG. 3 shows subsets of the terminals 206 poised for loading into the connector housing 204 and one of the TPA devices 140 poised for loading into the connector housing 204. FIG. 3 shows subsets of the terminals 306 poised for loading into the connector housing 304 and one of the TPA devices 150 poised for loading into the connector housing 304.

The connector housing 204 includes a base 220 and a plurality of terminal cavities 230 extending through the base 220. The terminal cavities 230 receive corresponding terminals 206. In an exemplary embodiment, the base 220 extends between a top 222 and a bottom 224 of the connector housing 204. The base 220 extends between a first side 226 and a second side 228 of the connector housing 204. The base 220 may be generally rectangular shaped. However, the base 220 may have other shapes in alternative embodiments.

In an exemplary embodiment, the connector housing 204 includes terminal tubes 232 extending forward from the base 220 to the front 211 of the connector housing 204 and cable tubes 234 extending rearward from the base 220 to the rear 213 of the connector housing 204. The terminal cavities 230 are open through the terminal tubes 232 and the cable tubes 234. The terminals 206 are received in the corresponding terminal tubes 232. The cables 202 are received in the corresponding cable tubes 234. Optionally, the terminals 206 may extend into the cable tubes 234 to connect with the cables 202. In various embodiments, the base 220 may be approximately centered between the front 211 and the rear 213. For example, the terminal tubes 232 may have lengths approximately equal to the cable tubes 234. However, in alternative embodiments, the base 220 may be closer to the front 211 or closer to the rear 213. In the illustrated embodiment, the terminal tubes 232 and the cable tubes 234 are generally cylindrical. However, the terminal tubes 232 and/or the cable tubes 234 may have other shapes in alternative embodiments.

Figure 4:
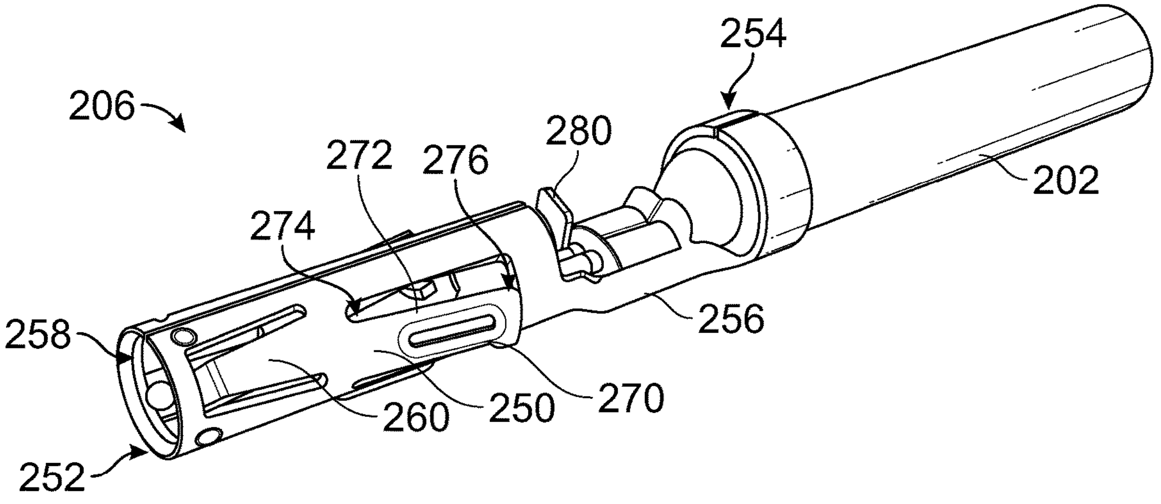
FIG. 4 is a front perspective view of an exemplary embodiment of the terminal.

With additional reference to FIG. 4, which is a front perspective views of an exemplary embodiment of the terminal 206, each terminal 206 includes a main body 250 extending between a mating end 252 and a terminating end 254. The terminating end 254 is configured to be terminated to the cable 202. In an exemplary embodiment, the terminal 206 includes a crimp barrel 256 at the terminating end 254 configured to be crimped to the end of the cable 202. In an exemplary embodiment, the terminal 206 includes a socket 258 at the mating end 252. The socket 258 is configured to receive a pin of the terminal 306 (FIG. 3). In an exemplary embodiment, the terminal 206 is stamped and formed. For example, the terminal 206 may be stamped from a metal sheet and formed into a tubular shape defining the socket 258 at the mating end 252.

In an exemplary embodiment, the terminal 206 includes mating beams 260 proximate to the front of the main body 250. Each mating beam 260 is stamped from the main body 250 and formed to have a curved mating interface proximate to the distal end thereof. The mating beam 260 is bent inward to extend into the socket 258 to interface with the terminal 306. The mating beam 260 is deflectable and configured to be deflected outward when interfacing with the terminal 306. Such deflection creates an internal spring force that biases the mating beam 260 inward toward the terminal 306 to maintain mechanical and electrical connection with the terminal 306.

In an exemplary embodiment, the terminal 206 includes locking lances 270. The locking lances 270 are used to secure the terminal 206 in the connector housing 204. In an exemplary embodiment, the locking lances 270 are formed integral with the main body 250. For example, the locking lances 270 are stamped and formed from the main body 250. The locking lances 270 are provided along opposite sides of the terminal 206. The locking lances 270 may be located at other positions in alternative embodiments. In the illustrated embodiment, the terminal 206 includes a pair of the locking lances 270; however, the terminal 206 may include greater or fewer locking lances 270 in alternative embodiments. Each locking lance 270 includes a lance arm 272 extending between a fixed end 274 and a free end 276. The free end is configured to engage the connector housing 204 to hold the terminal 206 in the terminal cavity 230.

In an exemplary embodiment, the terminal 206 includes a orientation tab 280 at the rear of the main body 250. The orientation tab 280 may extend radially outward from the main body 250. In an exemplary embodiment, the orientation tab 280 is formed integral with the main body 250, such as being stamped and formed with the main body 250. The orientation tab 280 is used to locate the terminal 206 in the connector housing 204. In the illustrated embodiment, the orientation tab 280 is located at the top of the terminal 206; however, the orientation tab 280 may be provided at other locations in alternative embodiments. Optionally, multiple orientation tabs may be provided in alternative embodiments.

With reference back to FIG. 3, the connector housing 304 includes a base 320 and a plurality of terminal cavities 330 extending through the base 320. The terminal cavities 330 receive corresponding terminals 306. In an exemplary embodiment, the base 320 extends between a top 322 and a bottom 324 of the connector housing 304. The base 320 extends between a first side 326 and a second side 328 of the connector housing 304. The base 320 may be generally rectangular shaped. However, the base 320 may have other shapes in alternative embodiments.

In an exemplary embodiment, the connector housing 304 includes a shroud 340 forming a receptacle 342 that receives the mating end 210 of the connector housing 204. The shroud 340 extends forward from the base 320. The shroud 340 is located at the mating end 310 of the connector housing 304. The shroud 340 is defined by walls along the top 322, the bottom 324, the first side 326 and the second side 328.

In an exemplary embodiment, the connector housing 304 includes terminal tubes 332 extending forward from the base 320 to the front 311 of the connector housing 304 and cable tubes 334 extending rearward from the base 320 to the rear 313 of the connector housing 304. The terminal tubes 332 extend into the receptacle 342. For example, the shroud 340 surrounds the terminal tubes 332. The terminal cavities 330 are open through the terminal tubes 332 and the cable tubes 334. The terminals 306 are received in the corresponding terminal tubes 332. The cables 302 are received in the corresponding cable tubes 334. Optionally, the terminals 306 may extend into the cable tubes 334 to connect with the cables 302. In the illustrated embodiment, the terminal tubes 332 and the cable tubes 334 are generally cylindrical. However, the terminal tubes 332 and/or the cable tubes 334 may have other shapes in alternative embodiments.

Figure 5:
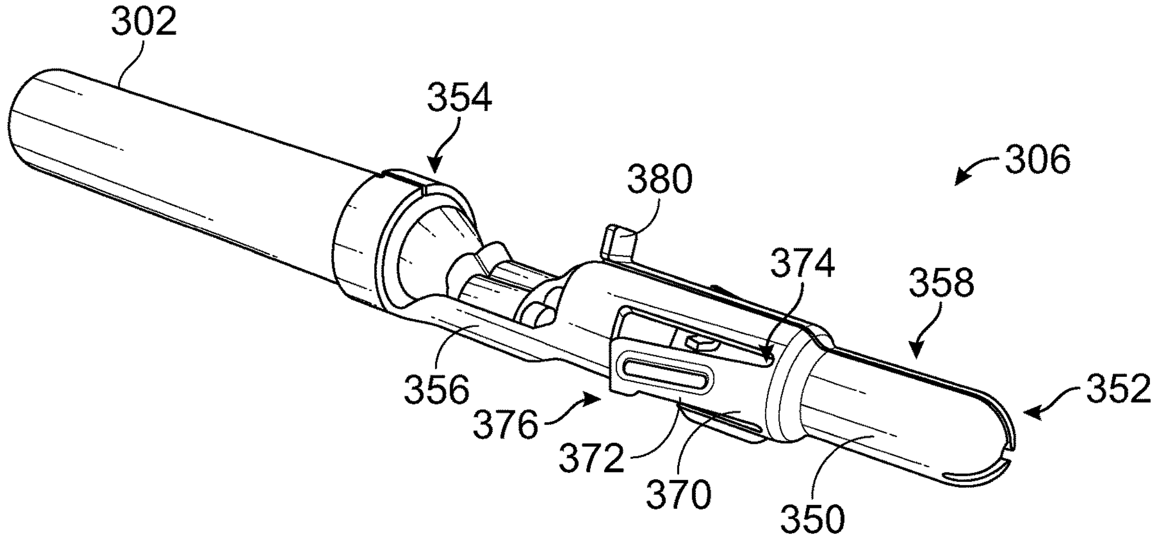
FIG. 5 is a front perspective view of an exemplary embodiment of the terminal.

With additional reference to FIG. 5, which is a front perspective view of an exemplary embodiment of the terminal 306, each terminal 306 includes a main body 350 extending between a mating end 352 and a terminating end 354. The terminating end 354 is configured to be terminated to the cable 302. In an exemplary embodiment, the terminal 306 includes a crimp barrel 356 at the terminating end 354 configured to be crimped to the end of the cable 302.

In an exemplary embodiment, the terminal 306 includes a pin 358 at the mating end 352. The pin 358 is configured to be received in the socket 258 of the terminal 206 (FIG. 4). In an exemplary embodiment, the terminal 306 is stamped and formed. For example, the terminal 306 may be stamped from a metal sheet and formed into a tubular shape with a tapered nose defining the pin 358 at the mating end 352.

In an exemplary embodiment, the terminal 306 includes locking lances 370. The locking lances 370 are used to secure the terminal 306 in the connector housing 304. The locking lances 370 may be similar to the locking lances 270 (FIG. 4). Each locking lance 370 includes a lance arm 372 extending between a fixed end 374 and a free end 376.

In an exemplary embodiment, the terminal 306 includes an orientation tab 380 at the rear of the main body 350. The orientation tab 380 may extend radially outward from the main body 350. In an exemplary embodiment, the orientation tab 380 is formed integral with the main body 350, such as being stamped and formed with the main body 350. The orientation tab 380 is used to locate the terminal 306 in the connector housing 304.

With reference back to FIG. 3, during assembly, the terminals 206 and cables 202 are loaded into the connector housing 204, such as through the rear 213. The terminals 206 and cables 202 are loaded into the terminal cavities 230 through the cable tubes 234. The terminals 206 pass through the base 220 into the terminal tubes 232. The sockets 258 at the mating ends 252 of the terminals 206 are positioned in the terminal tubes 232 for mating with the terminals 306. When the terminals 206 are fully inserted into the connector housing 204, the locking lances 270 flex outward to engage the connector housing 204 to hold the terminals 206 in the connector housing 204. For example, the free ends 276 of the locking lances 270 engage a retention feature, such as a retention shoulder of the base 220. The locking lances 270 prevent rearward pullout of the terminals 206 from the connector housing 204. In an exemplary embodiment, the orientation tabs 280 are used to orient the terminals 206 in the terminal cavities 230. For example, the orientation tabs 280 engage the connector housing 204 to properly position the terminals 206 in the connector housing 204. The orientation tabs 280 may orient the terminals 206 at predetermined angular (for example, rotational) positions within the terminal cavities 230. In an exemplary embodiment, when assembled, the orientation tabs 280 prevent rotation of the terminals 206 into the connector housing 204.

During assembly, the terminals 306 and cables 302 are loaded into the connector housing 304, such as through the rear 313. The terminals 306 and cables 302 are loaded into the terminal cavities 330 through the cable tubes 334. The terminals 306 pass through the base 320 into the terminal tubes 332. The pins 358 at the mating ends 352 of the terminals 306 are positioned in the terminal tubes 332 for mating with the sockets 258 of the terminals 206. When the terminals 306 are fully inserted into the connector housing 304, the locking lances 370 flex outward to engage the connector housing 304 to hold the terminals 306 in the connector housing 304. For example, the free ends 376 of the locking lances 370 engage a retention feature, such as retention shoulder of the base 320. The locking lances 370 prevent rearward pullout of the terminals 306 from the connector housing 304. In an exemplary embodiment, the orientation tabs 380 are used to orient the terminals 306 in the terminal cavities 330. For example, the orientation tabs 380 engage the connector housing 304 to properly position the terminals 306 in the connector housing 304. The orientation tabs 380 may orient the terminals 306 at predetermined angular (for example, rotational) positions within the terminal cavities 330. In an exemplary embodiment, when assembled, the orientation tabs 380 prevent rotation of the terminals 306 into the connector housing 304.

During mating, the mating end 210 of the connector housing 204 is plugged into the receptacle 342 at the mating end 310 of the connector housing 304. The shroud 340 surrounds the mating end 210 of the connector housing 204. In an exemplary embodiment, the terminal tubes 232 are loaded into the terminal tubes 332. The terminals 206 are mated to the terminals 306. For example, the pins 358 are loaded into the sockets 258. The mating beams 260 engage the pins 358 of the terminals 306 to electrically engage the terminals 206 to the terminals 306.

Figure 6:
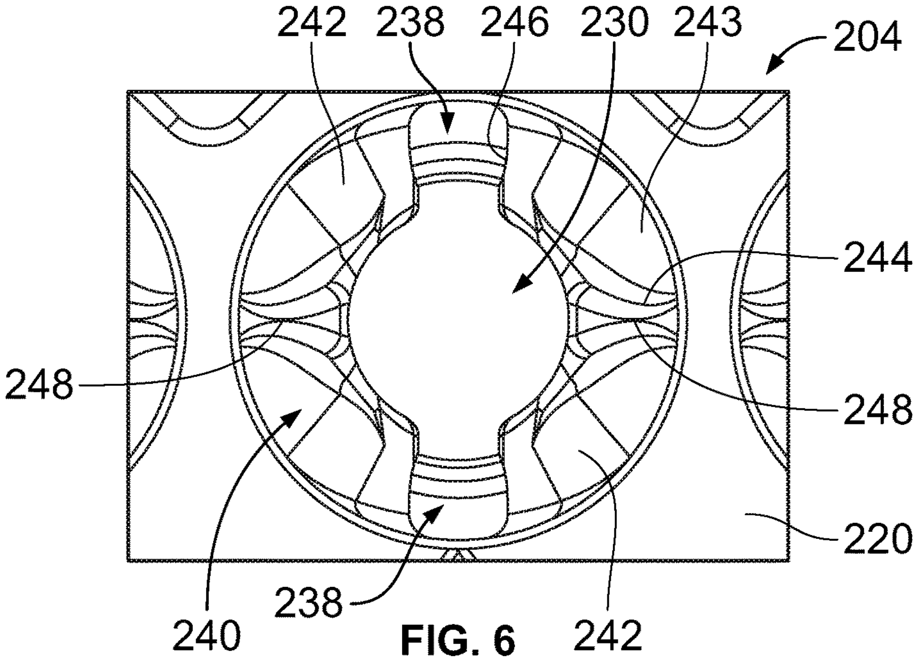
FIG. 6 is a rear view of a portion of the connector housing showing one of the terminal cavities in accordance with an exemplary embodiment.
Figure 7:
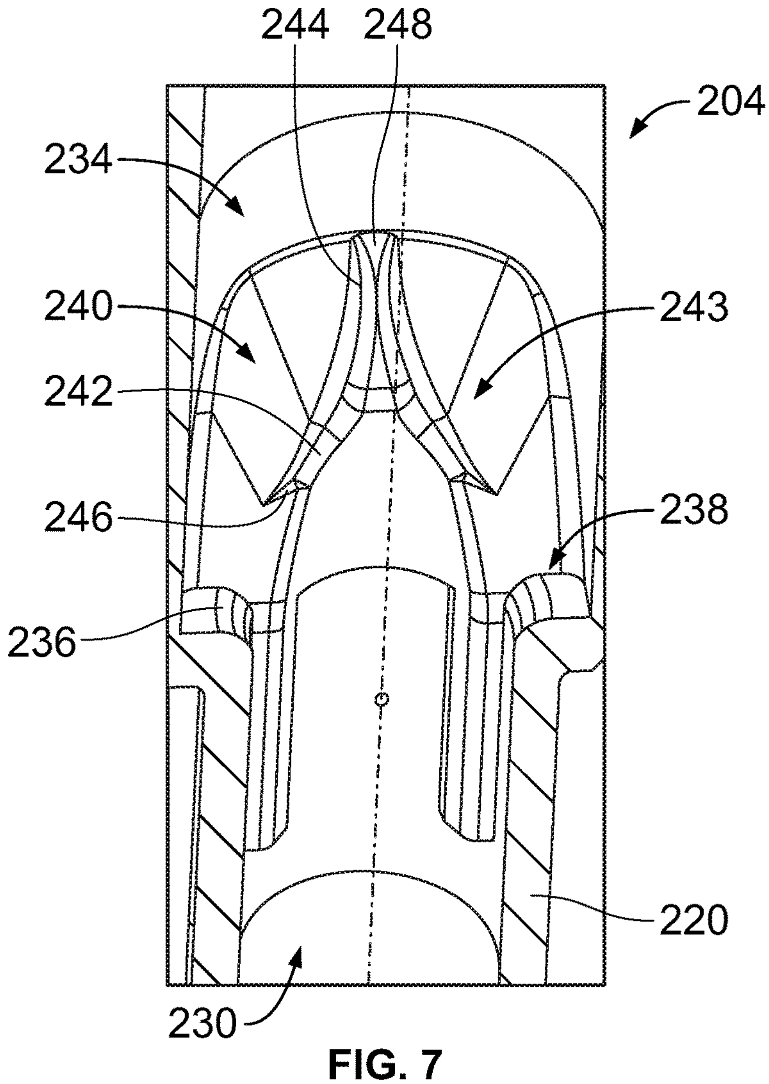
FIG. 7 is a cross sectional view of a portion of the connector housing showing one of the terminal cavities in accordance with an exemplary embodiment.

FIG. 6 is a rear view of a portion of the connector housing 204 showing one of the terminal cavities 230 in accordance with an exemplary embodiment. FIG. 7 is a cross sectional view of a portion of the connector housing 204 showing one of the terminal cavities 230 in accordance with an exemplary embodiment. FIGS. 6 and 7 illustrate positioning features for positioning the terminals 206 in the terminal cavities 230. In an exemplary embodiment, the connector housing 304 includes similar features in the terminal cavities 330 for positioning the terminals 306 in the connector housing 304.

In an exemplary embodiment, the base 220 of the connector housing 204 includes a retention shoulder 236 within the terminal cavity 230. The retention shoulder 236 is forward facing. The locking lance 270 (FIG. 4) is configured to engage the retention shoulder 236 to retain the terminal 206 in the terminal cavity 230. For example, after the locking lance 270 is loaded into the terminal cavity 230 beyond the retention shoulder 236, the locking lance 270 springs outward to engage the retention shoulder 236 and prevent pullout of the terminal 206 from the terminal cavity 230.

In an exemplary embodiment, the base 220 includes one or more orientation slots 238. The orientation slots 238 are configured to receive the orientation tab(s) 280 of the terminal 206 to orient the terminal 206 in the connector housing 204. For example, the orientation slots 238 define an angular (for example, rotational) position of the terminal 206 in the terminal cavity 230. The orientation slots 238 extend radially outward from the terminal cavity 230 in the illustrated embodiment. The orientation slots 238 are open at the rear to receive the orientation tab 280 when the terminal is rear loaded into the terminal cavity 230. In the illustrated embodiment, the connector housing 204 includes two of the orientation slots 238 opposite each other (for example, at the top and the bottom of the terminal cavity 230). Other positions are possible in alternative embodiments. In other embodiments, greater or fewer orientation slots 238 may be provided.

In an exemplary embodiment, the connector housing 204 includes guide funnels 240 in the terminal cavities 230, which are used to guide the terminals 206 into proper position in the terminal cavities 230. For example, each terminal cavity 230 includes the corresponding guide funnel 240 at the rear of the connector housing 204, such as in the cable tube 234. The guide funnel 240 is used to align the orientation tab 280 with the orientation slot 238. For example, the orientation tab 280 may engage the guide funnel 240 during loading of the terminal 206 into the terminal cavity 230. The guide funnel 240 forces the orientation tab 280 into alignment with the orientation slot 238. For example, the guide funnel 240 may cause the terminal 206 to rotate as the terminal is loaded into the terminal cavity 230 until the orientation tab 280 is aligned with the orientation slot 238. The guide funnel 240 converts the axial loading movement of the terminal 206 into rotational movement of the terminal 206 to align the orientation tab 280 with the orientation slot 238.

In an exemplary embodiment, the guide funnel 240 includes a ramp 242 angled toward the orientation slot 238. The orientation tab 280 is configured to ride along the ramp 242 to align the orientation tab 280 with the orientation slot 238. The ramp 242 is angled transverse to a longitudinal axis of the terminal cavity 230 (for example, the ramp 242 does not extend parallel to the longitudinal axis and does not extend perpendicular to the longitudinal axis. The contour of the ramp 242 guides the orientation tab 280 along a path to align the orientation tab 280 with the orientation slot 238. For example, the ramp 242 includes a cam surface 243 for converting linear motion of the terminal 206 in a loading direction to rotating motion of the terminal 206 in an alignment direction. The ramp 242 extends between a first end 244 and a second end 246. The first end 244 is at a rear of the ramp 242 and the second end 246 is at a front of the ramp 242. The second end 246 is aligned with the orientation slot 238. The first end 244 is angularly offset relative to the orientation slot 238. In an exemplary embodiment, the ramp 242 has a profile configured to guide the orientation tab 280 along the ramp 242 as the terminal 206 is loaded into the terminal cavity 230. In various embodiments, the profile of the ramp 242 may be curved. For example, the ramp 242 may extend along a helical path from the first end 244 to the second end 246. The profile of the ramp 242 may extend along other curved paths in alternative embodiments.

In an exemplary embodiment, the guide funnel 240 includes a ridge 248 extending into the terminal cavity 230, such as into the cable tube 234. The ramp 242 extends from the ridge 248 to the orientation slot 238. For example, the first end 244 is located at the ridge 248 and the second end 246 is located at the orientation slot 238. In an exemplary embodiment, the guide funnel 240 includes two ramps 242 extending in opposite directions from the ridge 248 to the corresponding orientation slots 238. For example, the ridge 248 may be approximately centered along the perimeter of the terminal cavity 230 between the orientation slots 238. The ramps 242 extend in opposite directions from the ridge 248 to the orientation slots 238. The ramps 242 are angled in different directions. For example, one of the ramps 242 may extend in a clockwise direction and the other ramp 242 may extend in a counterclockwise direction. Each of the ramps 242 extend along approximately a 90° curved path from the ridge 248 to the orientation slot 238. In an exemplary embodiment, the guide funnel 240 includes two of the ridges 248 on opposite sides of the terminal cavity 230. A pair of the ramps 242 extend to the first orientation slot 238 and a different pair of the ramps 242 extend to the second orientation slot 238. Other arrangements are possible in alternative embodiments. For example, the ridges 248 may be located immediately adjacent the orientation slots 238 each having a single ramp 242 extending to the opposite orientation slot 238 along approximately 180° curved path.

Without the guide funnel 240 and the ramps 242, the terminal 206 may be improperly or not fully loaded into the terminal cavity 230. For example, stubbing of the orientation tab on the connector housing 204 could occur leading to improper loading and/or partial loading and/or damage to the terminal 206. However, with the inclusion of the guide funnel 240, the ramps 242 automatically ensure proper loading (for example, proper orientation and fully loading) of the terminal 206 into the connector housing 204. The assembly process may be automated rather than manual by including the guide funnel 240.

Figure 8:
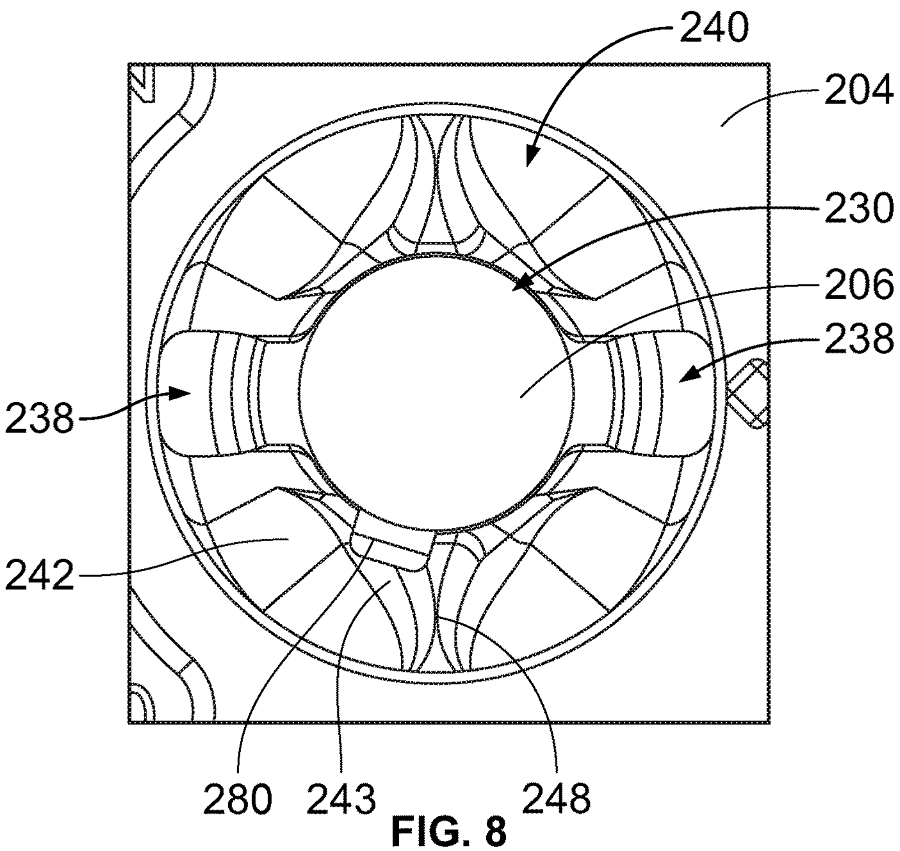
FIG. 8 is a rear view of a portion of the connector housing showing the terminal initially loaded into the terminal cavity and initially interfacing with the guide funnel in accordance with an exemplary embodiment.
Figure 9:
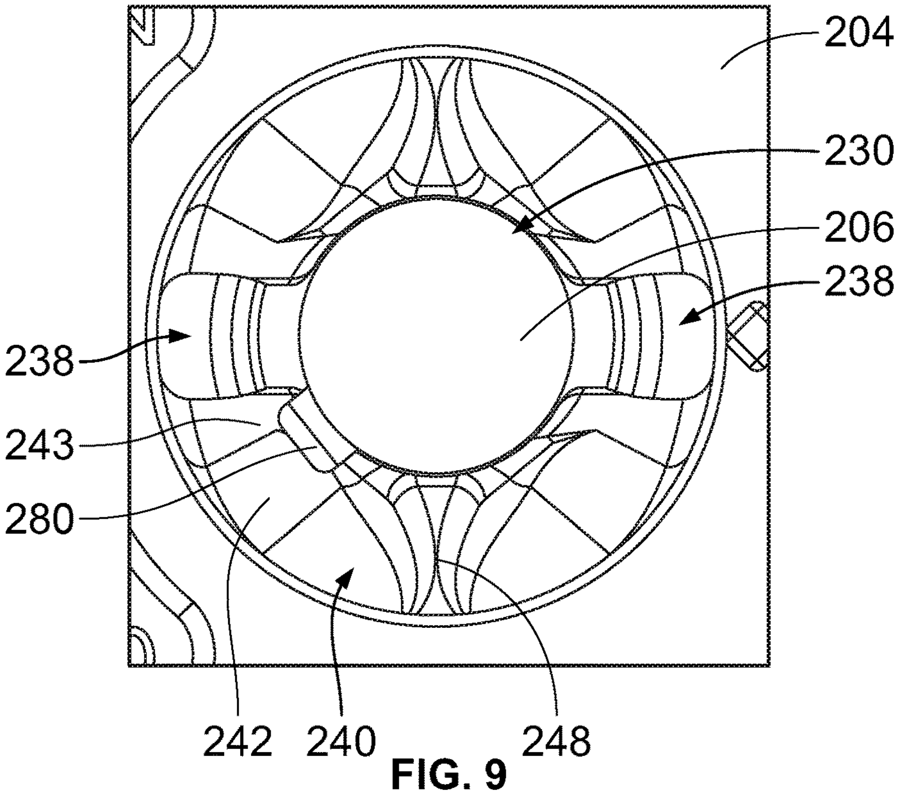
FIG. 9 is a rear view of a portion of the connector housing showing the terminal partially loaded into the terminal cavity and showing the orientation tab advanced down the ramp toward the orientation slot in accordance with an exemplary embodiment.
Figure 10:
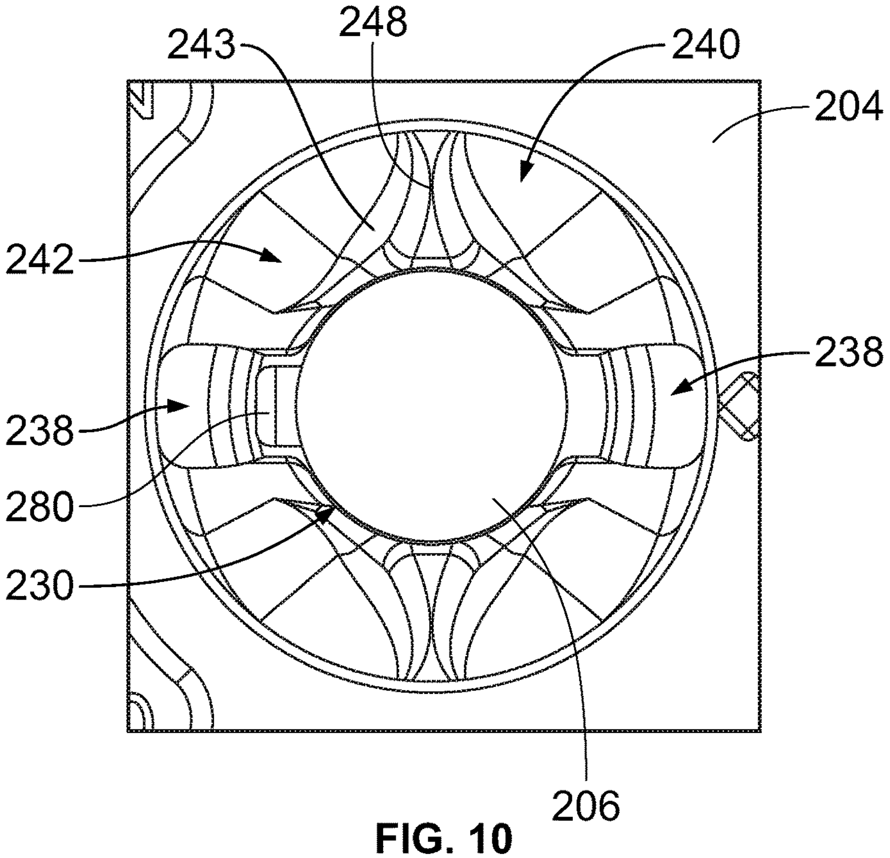
FIG. 10 is a rear view of a portion of the connector housing showing the terminal fully loaded into the terminal cavity and showing the orientation tab received in the orientation slot in accordance with an exemplary embodiment.

FIG. 8 is a rear view of a portion of the connector housing 204 showing the terminal 206 initially loaded into the terminal cavity 230 and initially interfacing with the guide funnel 240. FIG. 9 is a rear view of a portion of the connector housing 204 showing the terminal 206 partially loaded into the terminal cavity 230 and showing the orientation tab 280 advanced down the ramp 242 toward the orientation slot 238. FIG. 10 is a rear view of a portion of the connector housing 204 showing the terminal 206 fully loaded into the terminal cavity 230 and showing the orientation tab 280 received in the orientation slot 238.

During assembly, the terminal 206 may be loaded into the terminal cavity 230 in any angular orientation (for example, with the orientation tab 280 at any angular orientation). The orientation tab 280 is configured to engage different ramps 242 when loaded into the terminal cavity 230 at different angular orientations. For example, each quadrant of the terminal cavity 230 may have a different ramp 242 that receives the orientation tab 280 when the orientation tab 280 is loaded into such quadrant. The ridge 248 directs the orientation tab 280 to one side or the other during loading. When the orientation tab 280 engages the guide funnel 240, the guide funnel 240 directs the orientation tab 280 to the appropriate orientation slot 238. The terminal 206 is automatically rotated to the proper orientation by the ramp 242 to align with the orientation slot 238. Forward loading of the terminal 206 in the terminal cavity 230 causes the orientation tab 280 to ride along the ramp 242 and rotate the terminal 206 to a proper orientation within the terminal cavity 230. For example, the orientation tab 280 rides along the cam surface 243 of the ramp, which converts the linear motion of the terminal 206 in the loading direction to rotating motion of the terminal 206 in an alignment direction (for example, clockwise or counterclockwise depending on the ramp). The orientation tab 280 is aligned with the orientation slot 238 in the proper orientation. When the orientation tab 280 is located in the orientation slot 238, the terminal 206 is restricted from rotating. As such, the orientation (for example, rotational position) of the terminal 206 is maintained by the connector housing 204 when the terminal 206 is fully loaded into the terminal cavity 230.

Figure 11:
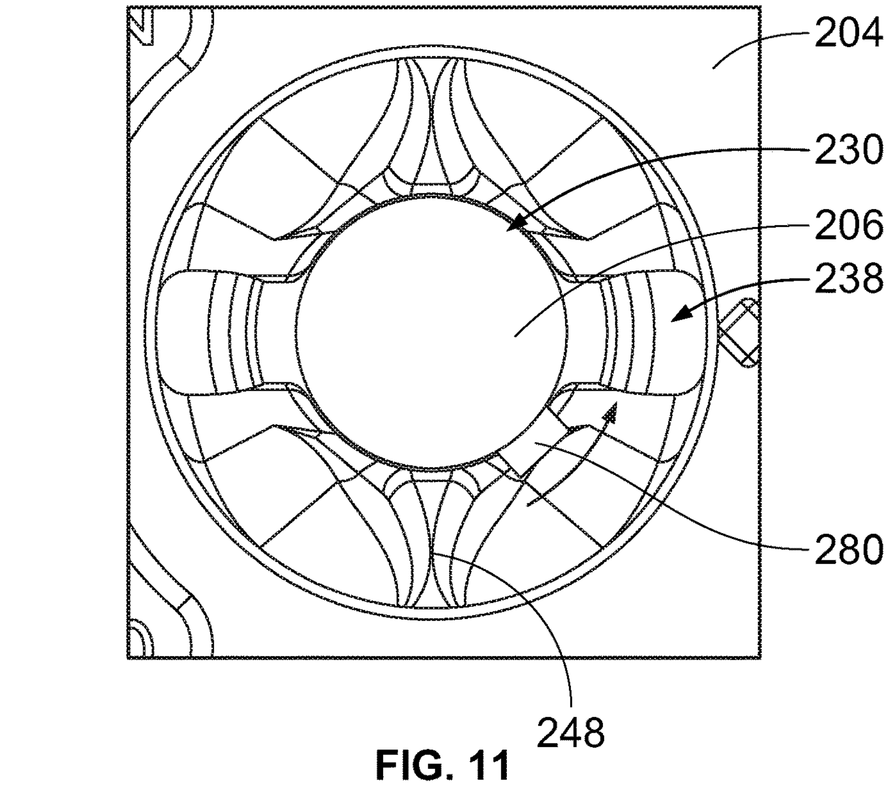
FIG. 11 is a rear view of a portion of the connector housing showing the terminal initially loaded into the terminal cavity in a different orientation than shown in FIG. 8 in accordance with an exemplary embodiment.
Figure 12:
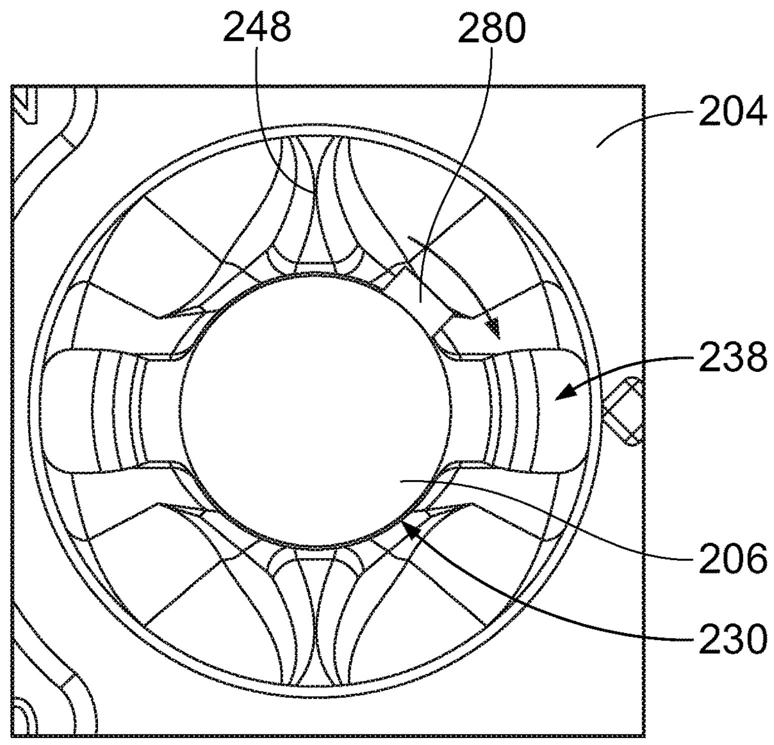
FIG. 12 is a rear view of a portion of the connector housing showing the terminal initially loaded into the terminal cavity in a different orientation than shown in FIGS. 8 and 11 in accordance with an exemplary embodiment.
Figure 13:
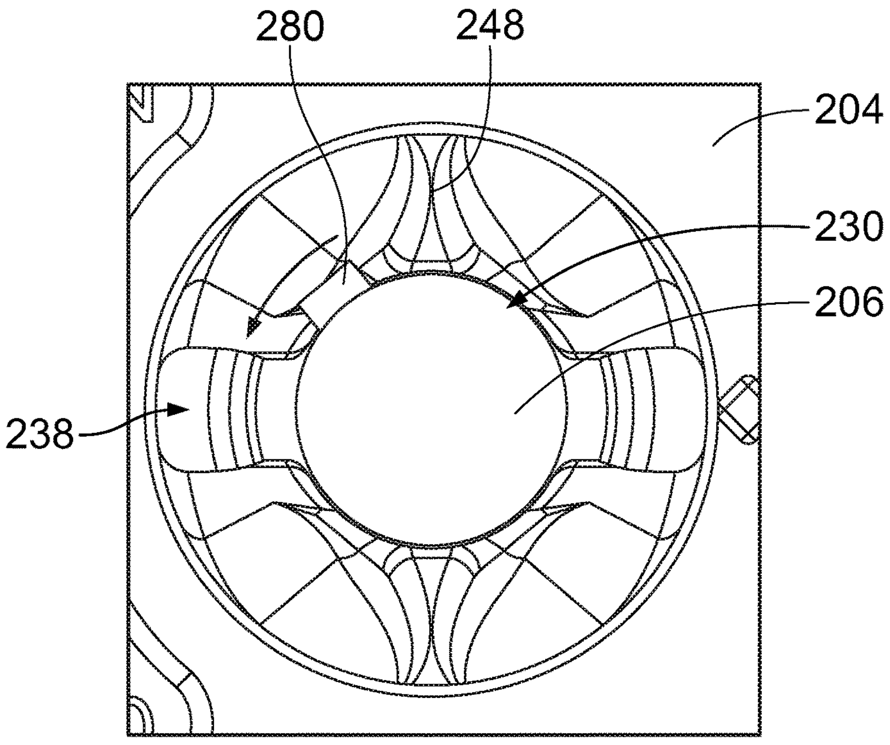
FIG. 13 is a rear view of a portion of the connector housing showing the terminal initially loaded into the terminal cavity in a different orientation than shown in FIGS. 8, 11 and 12 in accordance with an exemplary embodiment.

FIG. 11 is a rear view of a portion of the connector housing 204 showing the terminal 206 initially loaded into the terminal cavity 230 in a different orientation than shown in FIG. 8. FIG. 12 is a rear view of a portion of the connector housing 204 showing the terminal 206 initially loaded into the terminal cavity 230 in a different orientation than shown in FIGS. 8 and 11. FIG. 13 is a rear view of a portion of the connector housing 204 showing the terminal 206 initially loaded into the terminal cavity 230 in a different orientation than shown in FIGS. 8, 11 and 12. FIG. 8 shows the orientation tab 280 loaded into the southwest quadrant. FIG. 11 shows the orientation tab 280 loaded into the southeast quadrant (opposite side of the ridge 248 from FIG. 8 and thus directed to the opposite orientation slot 238). FIG. 12 shows the orientation tab 280 loaded into the northeast quadrant. FIG. 13 shows the orientation tab 280 loaded into the northwest quadrant.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector system comprising:

a connector housing including a base and a plurality of terminal cavities extending through the base, the base including a retention shoulder within each terminal cavity, the base including orientation slots associated with the corresponding terminal cavities, the base including guide funnels funneling into the corresponding terminal cavities, each guide funnel including a ramp angled toward the orientation slot, wherein the ramp extends helically between a first end and a second end of the ramp; and terminals received in the corresponding terminal cavities, each terminal including an orientation tab, the orientation tab configured to be received in the funnel and guided by the ramp to the orientation slot, the orientation tab being received in the orientation slot to orient the terminal relative to the connector housing, each terminal including a locking lance engaging the corresponding retention shoulder to retain the terminal in the corresponding terminal cavity.

2. The electrical connector system of claim 1, wherein the ramp is angled transverse to a longitudinal axis of the terminal cavity.

3. The electrical connector system of claim 1, wherein the ramp causes the terminal to rotate as the terminal is loaded into the terminal cavity until the orientation tab is aligned with the orientation slot.

4. The electrical connector system of claim 1, wherein the ramp includes a cam surface for converting linear motion of the terminal in a loading direction to rotating motion of the terminal in an alignment direction.

5. The electrical connector system of claim 1, wherein the ramp is a first ramp, and the guide funnel includes a second ramp angled toward the orientation slot.

6. The electrical connector system of claim 1, wherein the orientation slot is a first orientation slot, the base includes a second orientation slot opposite the first orientation slot, and the guide funnel includes a second ramp angled toward the second orientation slot.

7. The electrical connector system of claim 6, wherein the guide funnel includes a third ramp angled toward the first orientation slot and a fourth ramp angled toward the second orientation slot.

8. The electrical connector system of claim 1, wherein the guide funnel includes a ridge extending parallel to a loading direction of the terminal into the connector housing, and the ramp extends from the ridge to the orientation slot.

9. The electrical connector system of claim 8, wherein the orientation tab is configured to funnel from the ridge onto the ramp.

10. The electrical connector system of claim 1, wherein the locking lance engages the retention shoulder to prevent axial movement of the terminal in the terminal cavity, and wherein the orientation tab is received in the orientation slot to prevent rotational movement of the terminal in the terminal cavity.

11. The electrical connector system of claim 1, wherein the terminal includes a main body extending between a front and a rear, the terminal including a crimp barrel extending rearward of the rear for connection to a cable, and the orientation tab extends radially outward from the main body.

12. The electrical connector system of claim 1, wherein the terminal includes a main body extending between a front and a rear, the terminal including a socket at the front configured to receive a pin terminal of a mating electrical connector, the terminal including a plurality of mating beams extending into the socket to electrically connect to the pin terminal.

13. The electrical connector system of claim 1, wherein the terminal cavities are arranged in rows and columns to hold the terminals in rows and columns for mating with mating terminals of a mating electrical connector.

14. The electrical connector system of claim 1, wherein the connector housing includes terminal tubes forward of the base and cable tubes rearward of the base, the terminal cavities extending through the corresponding terminal tubes and the corresponding cable tubes, the terminals including mating ends in the corresponding terminal tubes for mating with mating terminals of a mating electrical connector, the terminals being terminated to cables, the cables extending through the cable tubes to exit the connector housing, the guide funnels extending along the cable tubes.

15. The electrical connector system of claim 1, wherein the guide funnel includes a ridge extending parallel to a loading direction of the terminal into the connector housing, wherein the first ramp extends from the ridge to the first orientation slot and the second ramp extends from the ridge to the second orientation slot.

16. An electrical connector system comprising:

a connector housing including a base and a plurality of terminal cavities extending through the base, the base including a retention shoulder within each terminal cavity, the base including orientation slots, the orientation slots including a first orientation slot and a second orientation slot associated with each terminal cavity, the base including guide funnels funneling into the corresponding terminal cavities, each guide funnel including a ridge located between the first orientation slot and the second orientation slot of the corresponding terminal cavity, each guide funnel including a first ramp angled between the ridge and the first orientation slot and a second ramp angled between the ridge and the second orientation slot; and terminals received in the corresponding terminal cavities, each terminal including an orientation tab, the orientation tab configured to be received in the funnel to interface with either the first ramp or the second ramp to funnel the orientation tab to the first orientation slot or the second orientation slot, respectively, to orient the terminal relative to the connector housing in either a first orientation or a second orientation, respectively, each terminal including a locking lance engaging the corresponding retention shoulder to retain the terminal in the corresponding terminal cavity.

17. The electrical connector system of claim 16, wherein the first ramp extends in a first helical direction between a first end and a second end of the first ramp, the second ramp extends in a second helical direction different than the first helical direction between a first end and a second end of the second ramp.

18. The electrical connector system of claim 16, wherein the first and second ramps are angled transverse to a longitudinal axis of the terminal cavity.

19. The electrical connector system of claim 16, wherein the first ramp causes the terminal to rotate in a clockwise direction as the terminal is loaded into the terminal cavity until the orientation tab is aligned with the first orientation slot, and wherein the second ramp causes the terminal to rotate in a counterclockwise direction as the terminal is loaded into the terminal cavity until the orientation tab is aligned with the second orientation slot.

20. An electrical connector system comprising:

a connector housing including a base and a plurality of terminal cavities extending through the base, the base including a retention shoulder within each terminal cavity, each terminal cavity including a first orientation slot and a second orientation slot opposite the first orientation slot, the base including guide funnels funneling into the corresponding terminal cavities, each guide funnel including a first ramp angled toward the first orientation slot and a second ramp angled toward the second orientation slot; and terminals received in the corresponding terminal cavities, each terminal including an orientation tab, the orientation tab configured to be received in the funnel and guided by either the first ramp or the second ramp to the corresponding first orientation slot or the second orientation slot, respectively, the orientation tab being received in the first orientation slot or the second orientation slot to orient the terminal relative to the connector housing, each terminal including a locking lance engaging the corresponding retention shoulder to retain the terminal in the corresponding terminal cavity.

* * * * *